United States Patent

Suzuki et al.

[11] Patent Number: 5,918,974
[45] Date of Patent: Jul. 6, 1999

[54] OPTICAL ILLUMINATION DEVICE

[75] Inventors: Takayuki Suzuki, Hachioji; Yumi Ikeda, Fuchu; Akira Hasegawa, Machida; Makoto Tomioka, Hachioji, all of Japan

[73] Assignee: Olympus Optical Co., Ltd., Tokyo, Japan

[21] Appl. No.: 08/834,466

[22] Filed: Apr. 11, 1997

[30] Foreign Application Priority Data

Apr. 17, 1996 [JP] Japan ................................ 8-095606

[51] Int. Cl.$^6$ ........................................................ F21V 7/04
[52] U.S. Cl. ........................ 362/560; 362/558; 362/554; 362/551
[58] Field of Search .............................. 362/32, 301, 346, 362/551, 554, 558, 559, 560

[56] References Cited

U.S. PATENT DOCUMENTS 5,491,765  2/1996  Matsumoto ............................. 385/33
5,526,237  6/1996  Davenport et al. ..................... 362/32
5,634,704  6/1997  Shikama et al. ........................ 353/31

FOREIGN PATENT DOCUMENTS

6-148524  5/1994  Japan .
7-006613  1/1995  Japan .

*Primary Examiner*—Ira S. Lazarus
*Assistant Examiner*—Ljiljana V. Ciric
*Attorney, Agent, or Firm*—Pillsbury Madison & Sutro LLP

[57] ABSTRACT

An optical illumination device includes a light emitting section of discharge type and a condenser mirror placed behind the light emitting section to introduce illumination light into a light transmitting fiber. The light emitting section is placed so that its vertical component is larger than its axial component. In this way, rays from the light emitting section can be efficiently introduced into the light transmitting fiber of small diameter without loss.

3 Claims, 10 Drawing Sheets

OPTICAL ILLUMINATION DEVICE

BACKGROUND OF THE INVENTION

1. Field of the Invention

This invention relates to an optical illumination device for efficiently introducing light emitted from a light source into a light transmitting fiber.

2. Description of Related Art

Figure 1:
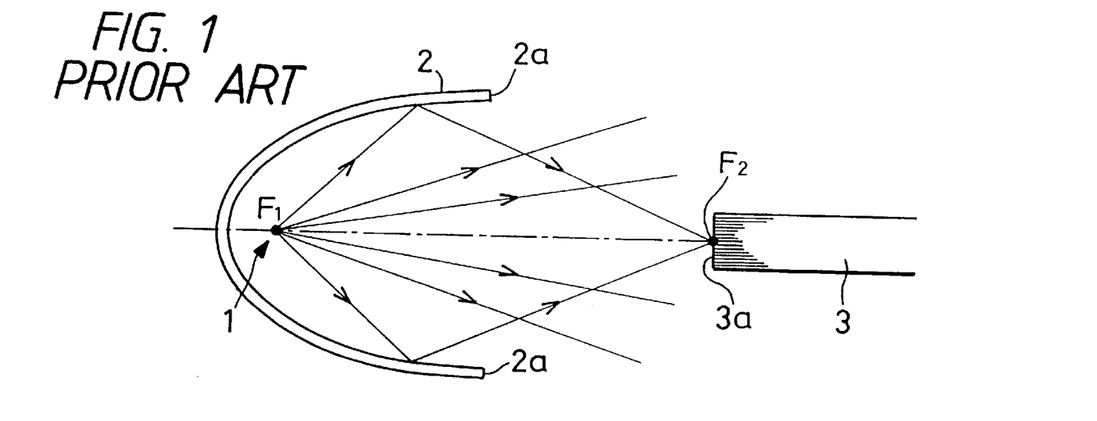
FIG. 1 is a view showing one example of a conventional optical illumination device.

FIG. 1 shows an optical illumination device which has been used in the past. This optical illumination device is such that most of light originating from a light source 1, with the exception of a fraction of light incident directly on a light transmitting fiber 3, is reflected and condensed by an elliptical mirror 2 and is incident on an entrance end 3a of the light transmitting fiber 3 located at the position of a focal point. Instead of the elliptical mirror 2, a concave mirror which is constructed with, for example, a parabolic, spherical, conical, or high-order curved surface has also been used.

The optical illumination device, when used in an endoscope, requires a considerable brightness to observe the interior of a dark cavity of the human body. Although the need for an endoscope with a small diameter is emphasized in particular, the brightness of the light source is generally not satisfactory for such a fine endoscope, and even from this viewpoint, an improvement of the brightness has been desired.

Consequently, the optical illumination device utilized for endoscopes requires rays of light emitted from the light source to be rendered as copious as possible (namely, a high condensation efficiency) and to be condensed in the smallest possible area (namely, a small condensation diameter).

In order to improve the brightness of the light source, where a xenon lamp which is short in light emission length and high in luminance is used as the light source, optical illumination devices having practical use have been proposed in the past. Here, the term "light emission length" means a dimension in the longitudinal direction of the light source which has a depth in a space of, for example, a light emitting region formed between the anode and the cathode of an electric discharge lamp or a light emitting section of a filament lamp.

Figure 2:
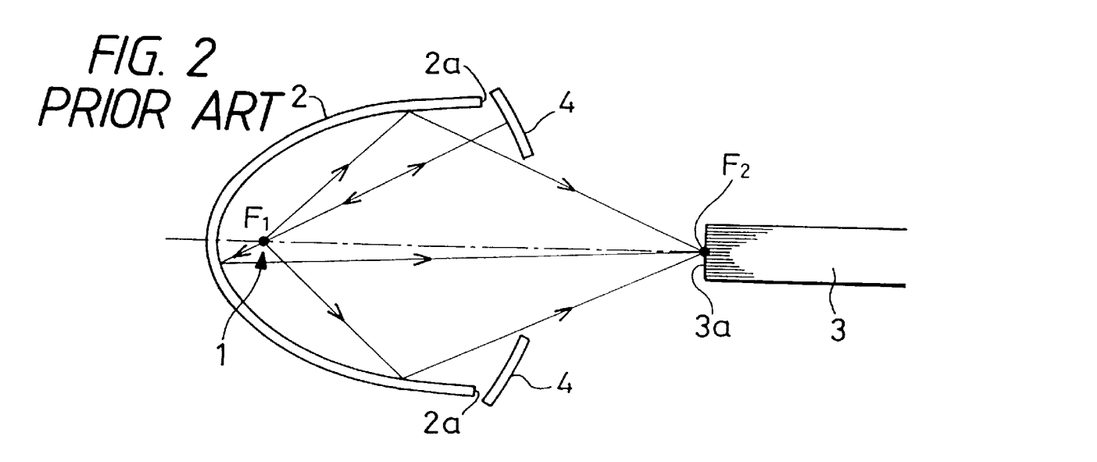
FIG. 2 is a view showing another example of the conventional optical illumination device.
Figure 3:
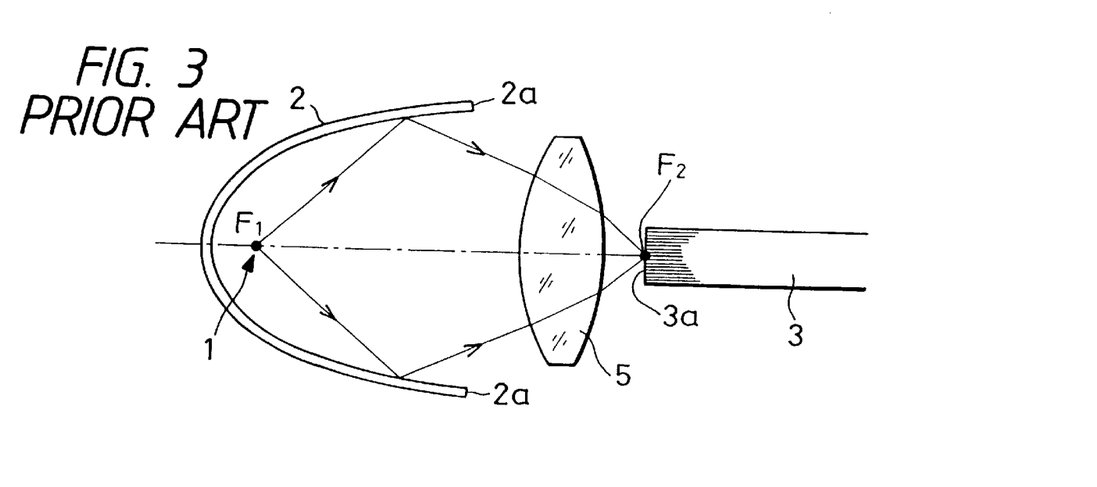
FIG. 3 is a view showing still another example of the conventional optical Illumination device.

For example, an optical illumination device such as that shown in FIG. 2 is available in which a reflecting mirror 4 is placed opposite to the elliptical mirror 2 between the light source 1 and the light transmitting fiber 3 so that light from the light source 1 which will be diffused between an opening edge 2a of the elliptical mirror 2 and the entrance end 3a of the light transmitting fiber 3 is reflected back to the light source 1, with a resulting increase in condensation efficiency. Alternatively, as shown in FIG. 3, an optical illumination device is available in which a condenser lens 5 is interposed between the light source 1 and the light transmitting fiber 3 to reduce the magnification of projection of the light source 1 on the entrance end 3a of the light transmitting fiber 3, thereby raising the condensation efficiency.

The xenon lamp of short light emission length and high luminance, however, is expensive in itself and generally requires large power consumption. Furthermore, a power supply for turning on the lamp and cooler are also expensive and oversized, and thus the problem is encountered that the optical illumination device using the xenon lamp is costly and becomes bulky. In contrast to this, where a metal halide lamp or a halogen lamp in which the light emission length is as long as 4–7 mm, but the lamp itself is lower in cost and requires less power to operate, is used in the optical illumination device, the power supply for turning on the lamp and the cooler are constructed at low cost and from compact design, and hence an inexpensive, small-sized optical illumination device can be provided. For this reason, the metal halide lamp and the halogen lamp are now being reconsidered.

Each of the optical illumination devices proposed in the past, mentioned above, because the light emission length of the light source is short, is effective for the use of the xenon lamp which has a relatively small bright-spot diameter and approximates a point source (and also has high luminance). Such an optical illumination device, however, is not effective for the case where the light emission length of the light source is longer, from the following reasons.

A case where the light source is a point source is first considered, As shown in FIG. 1, all rays emitted from the point source 1 lying at a first focal point $F_1$ of the elliptical mirror 2 and reflected by the elliptical mirror 2 are condensed at a second focal point $F_2$. As depicted in FIG. 2, when the reflecting mirror 4 having the center of curvature at the first focal point $F_1$ of the elliptical mirror 2 is placed opposite to the elliptical mirror 2, rays emitted from the light source 1 and reflected by the reflecting mirror 4, after being condensed at the position of the light source 1, are further condensed through the elliptical mirror 2 at the second focal point $F_2$ of the elliptical mirror 2. In this way, all of light emitted from the light source 1 and reflected by the elliptical mirror 2 and the reflecting mirror 4 can be condensed at the second focal point $F_2$ of the elliptical mirror 2. Further, as shown in FIG. 3, when the condenser lens 5 is interposed between the elliptical mirror 2 and the light transmitting fiber 3, the rays are uniformly condensed, with a high condensation density, and can be practically brought to a focus. Consequently, it is found that each of the optical illumination devices proposed in the past, when using the lamp which is short in light emission length as the light source and approximates the point source, is capable of condensing most of the rays emitted from the light source 1 in a small area and brings about a desired effect.

Figure 4:
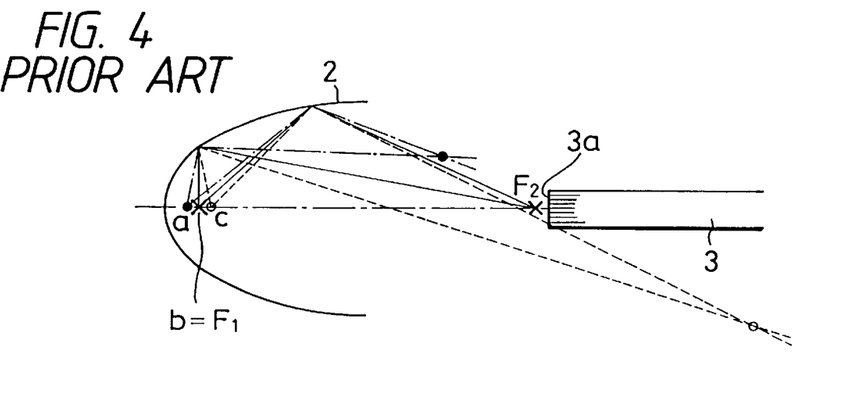
FIG. 4 is an explanatory view showing a condensation principle in the case where a light source has a dimension along the direction of the optical axis.

Subsequently, another case is considered in which the light source has a relatively long light emission length in the direction of the optical axis. The light source, as shown in FIG. 4, can be regarded as an assembly of point sources. Thus, in view of a condensation principle when the light source is placed on the optical axis, the case is discussed in which the center of the light source having a dimension in the direction of the optical axis is located at the first focal point $F_1$ of the elliptical mirror 2 and, as in FIG. 4, three point sources a, b, and c are provided as the constituents of this light source. Rays emitted from the point source b located at the first focal point $F_1$ are condensed at the second focal point $F_2$ by the elliptical mirror 2. On the other hand, other rays emitted from the point source c shifted from the first focal point $F_1$ toward the light transmitting fiber 3 are condensed below the optical axis, and the remaining rays emitted from the source point a shifted from the first focal point $F_1$ toward the elliptical mirror 2 are condensed above the optical axis, having great distances before and behind the second focal point $F_2$. In this case, an image, projected by the elliptical mirror 2, of the light source having the dimension in the direction of the optical axis is inclined with respect to the optical axis. Moreover, in view of a cross section containing the second focal point $F_2$, the image has a considerably wide condensation circle.

As the position of a point source is distant from the first focal point $F_1$, rays emitted from this point source are condensed farther away from the second focal point F2. Consequently, only rays emitted from point sources situated in close vicinity to the first focal point F1 can be rendered incident on a comparatively fine fiber placed adjacent to the second focal point F1. Furthermore, where there is a peak distribution in the vicinity of the electrodes of ends (which corresponds to a region far distant from the first focal point F1) constituting the light source (as in the metal halide lamp), it is found that the condensation efficiency is entirely impaired.

Figure 5:
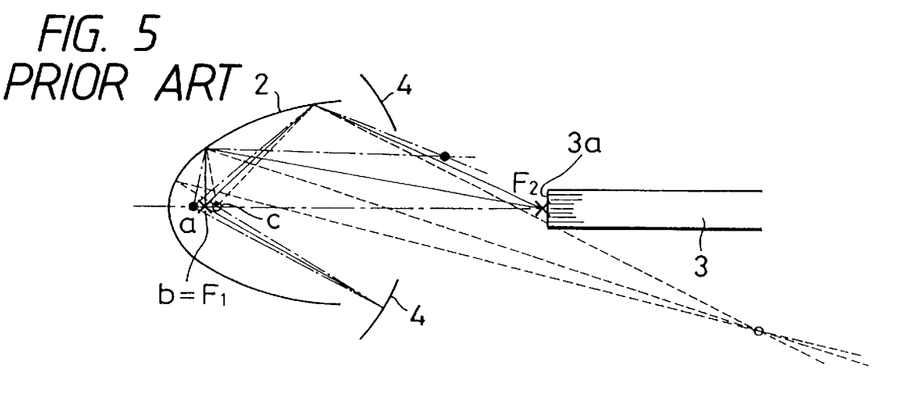
FIG. 5 is an explanatory view showing a state of condensation when a reflecting mirror is placed opposite to an elliptical mirror in the case where the light source has the dimension along the direction of the optical axis.

Thus, when the light source has a relatively great light emission length in the direction of the optical axis, as shown in FIG. 5, the case is discussed in which the reflecting mirror 4 having the center of curvature at the first focal point F1 of the elliptical mirror 2 is placed opposite to the elliptical mirror 2, as proposed in the past. It is assumed that the light source is placed so that its center coincides with the first focal point F1 of the elliptical mirror 2. In the light source having the dimension in the direction of the optical axis, as mentioned above, only the rays emanating from the vicinity of the first focal point F1 of the elliptical mirror 2, after being reflected by the elliptical mirror 2, can effectively enter the light transmitting fiber 3. On the other hand, in the case of rays diffused between the opening edge 2a of the elliptical mirror 2 and the entrance end 3a of the light transmitting fiber 3, the rays originating from the points a and c are collected at the points c and a, respectively, by the reflecting mirror 4. In this way, rays to be collected in the vicinity of the first focal point F1 by the reflecting mirror 4 are limited to those emanating from the points, located close to the first focal point F1, of the light source. As a result, the problem is encountered that, even with the reflecting mirror 4, only the rays emanating from the points, close to the first focal point F1, of the light source having the dimension in the direction of the optical axis are condensed in a small area.

Figure 6:
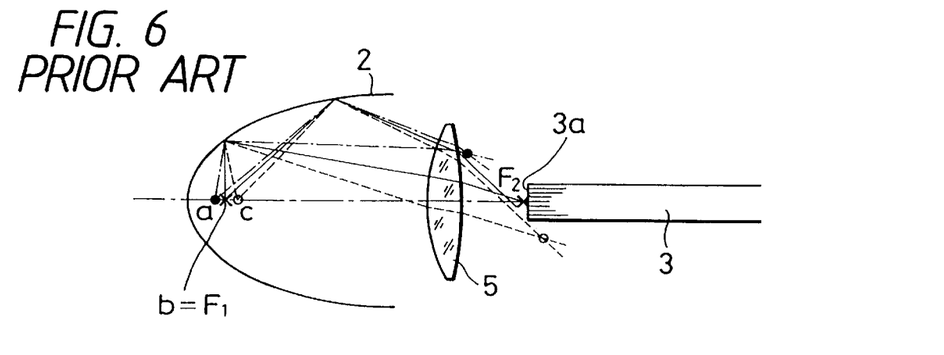
FIG. 6 is an explanatory view showing a state of condensation when a condenser lens is interposed between the elliptical mirror and a light transmitting fiber in the case where the light source has the dimension along the direction of the optical axis.

When the light emission length of the light source is long, as depicted in FIG. 6, the case is discussed in which the condenser lens 5 is interposed between the elliptical mirror 2 and the light transmitting fiber 3, as proposed in the past, to demagnify the projected image of the light source and increase the amount of light incident on the light transmitting fiber 3. Since, as stated above, the projected image of the light source formed by the elliptical mirror 2 is inclined with respect to the optical axis, it is impossible that the rays are uniformly collected by condenser lens 5 and the projected image of the light source is demagnified. As such, rays capable of being incident on the light transmitting fiber 3 are eventually limited to those emanating from the points, close to the first focal point F1, of the light source, and hence there is the problem that the placement of the condenser lens 5 brings about very little effect.

In the optical illumination device for introducing the light from the light source into the light transmitting fiber 3, where the metal halide lamp or halogen lamp which has a long light emission length is used as the light source, the luminance itself of the light source is low, and thus rays from respective regions of the light source must be condensed in a small area, without loss. If, however, the light source having the long light emission length is used in the conventional optical illumination device, as stated above, only the rays emanating from the points, close to the first focal point F1 of the elliptical mirror 2, of the light source can be condensed in the small area, and a large amount of light will not be introduced into the light transmitting fiber 3. In order to effectively use the light source having the long light emission length, the optical illumination device with a shape and construction which are most suitable for the light source is required.

SUMMARY OF THE INVENTION

It is, therefore, an object of the present invention to provide an optical illumination device which is low in cost and compact in design that when the light source which is low in luminance and has a relatively long light emission length is used, rays emanating from respective regions of the light source can be rendered efficiently incident on the light transmitting fiber having a small effective diameter with a minimum loss.

In order to achieve this object, according to one aspect of the present invention, the optical illumination device includes a light emitting section of electric discharge type and a condenser mirror placed behind the light emitting section to introduce illumination light into a light transmitting fiber, wherein the light emitting section, which is elongate in shape, is placed so that a component projected in a direction normal to the optical axis (namely, a vertical component) is larger than a component projected in the direction of the optical axis (namely, an axial component).

According to another aspect of the present invention, the optical illumination device includes a light source having a dimension in the direction of the optical axis and a condenser mirror placed behind the light source to introduce illumination light into a light transmitting fiber, wherein the center of the light source is located at, or close to, the position of the focal point of the condenser mirror, which is constructed so that an image of the light source formed by the condenser mirror becomes vertical, or practically vertical, with respect to the optical axis.

For the first aspect of the present invention stated above, a first point spaced away from the focal point of the condenser mirror in the direction of the optical axis fails to lie on a reflection path connecting the focal point of the condenser mirror with a condensed point, while a second point spaced away from the focal point of the condenser mirror in a direction perpendicular to the optical axis lies on the reflection path. Thus, in the vicinity of the entrance end of the light transmitting fiber, rays emanating from the second point are superior in condensation efficiency to those from the first point. In this way, the light emitting section is placed so that its vertical component becomes larger than its axial component, and thereby, in addition to the rays emanating from one region, close to the focal point, of the light emitting section to enter the light transmitting fiber, it becomes possible that rays emanating from other regions of the light emitting section are incident on the light transmitting fiber. Hence, the amount of light incident on the light transmitting fiber is increased.

As for the second aspect of the present invention, the condenser mirror is constructed so that the image of the light source formed by the condenser mirror becomes vertical, or practically vertical, with respect to the optical axis, and thereby, in the vicinity of the entrance end of the light transmitting fiber, a condensation density is raised. In addition to the rays emanating from one region, close to the focal point, of the light emitting section to enter the light transmitting fiber, it becomes possible that rays emanating from other regions of the light emitting section are incident on the light transmitting fiber, and hence the amount of light incident on the light transmitting fiber is increased. Furthermore, as mentioned above, rays emitted from respective points of the light source are condensed in the same plane nearly perpendicular to the optical axis, and thus when a condenser lens is interposed between the condenser mirror and the entrance end of the light transmitting fiber, the rays emitted from respective points of the light source can be uniformly condensed in a narrow area and the effect of the condenser lens is enhanced.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

The embodiments of the optical illumination device according to the present invention will be explained in detail below with reference to the drawings.

First embodiment

FIGS. 7 to 12 show the first embodiment of the optical illumination device according to the present invention. As is obvious from these figures, the optical illumination device chiefly includes the light emitting section, the elliptical mirror 2 having a relatively short focal length, and the light transmitting fiber 3.

In FIG. 4, showing the conventional optical illumination device, the entrance end 3a of the light transmitting fiber 3 practically coincides with the second focal point $F_2$ of the elliptical mirror 2. However, the two points a and c deviate largely from an optical path originating from the first focal point $F_1$ and after reflection by the elliptical mirror 2, arriving at the second focal point $F_2$ (which is hereinafter referred to as a reflection path), and thus rays emitted from the two points a and c cannot reach the second focal point $F_2$. As such, rays emanating from the point c shifted from the first focal point $F_1$ toward the light transmitting fiber 3 are condensed below the optical axis, and other rays emitted from the point a shifted from the first focal point $F_1$ toward the elliptical mirror 2 are condensed above the optical axis, at great distances from the focal point $F_2$ with respect to the optical axis. Consequently, rays capable of being incident on the light transmitting fiber 3 are limited to those emanating from the points, close to the first focal point $F_1$, of the light emitting section.

Figure 7:
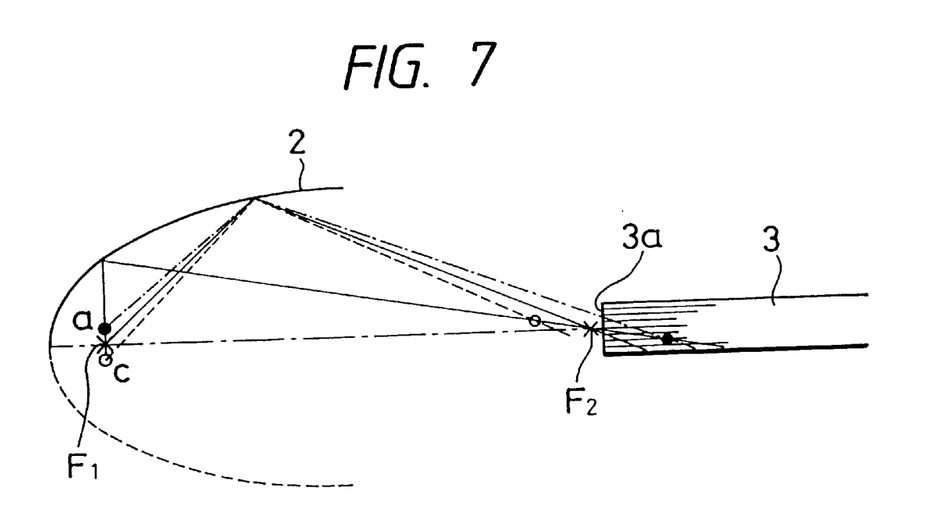
FIG. 7 is an explanatory view showing a state of condensation of rays emanating from points spaced in a direction perpendicular to the optical axis in a first embodiment of the optical illumination device according to the present invention.

By contrast with this, in FIG. 7, rays emitted from the two points a and c, of the light emitting section, spaced away from the first focal point $F_1$ in the direction perpendicular to the optical axis are condensed close to the second focal point $F_2$. Since these two points a and c lie on the reflection path, mentioned above, connecting the first focal point $F_1$ and the second focal point $F_2$, the rays leaving the two points a and c and traveling along the reflection path necessarily reach the second focal point $F_2$. Thus, other rays each having a spread, emitted from the two points a and c, also arrive in the neighborhood of the second focal point $F_2$ with little deviation from the reflection path connecting the first focal point F1 and the second focal point F2, bringing about a good condensation efficiency. As a consequence of this, it becomes possible that, in addition to rays emanating from a region, close to the first focal point F1, of the light emitting section, and capable of entering the light transmitting fiber 3, rays emanating from other regions of the light emitting section are also incident on the light transmitting fiber 3.

From the reason of the foregoing, if the light emitting section is oriented so that its vertical component becomes larger than its axial component, rays from respective regions of the light emitting section will be incident on the light emitting fiber 3 without loss. In the first embodiment, where use is made of the metal halide lamp such as to have the peak distribution in the vicinity of the electrodes of ends constituting the light source, rays emanating from the portion of high luminance of the light emitting section can be copiously secured, and hence the amount of light capable of entering the light transmitting fiber 3 is materially increased.

For specific ways of placing the light emitting section so that the vertical component becomes larger than the axial component, it is considered that the light emitting section is oriented so that its longitudinal direction is inclined at 45° or more with respect to the optical axis and that the light emitting section is placed so that the longitudinal direction becomes perpendicular to the optical axis. In the case of the former way that the longitudinal direction is inclined, the axial component of the light emitting section is large compared with the case of the latter way that the longitudinal direction becomes perpendicular. Hence, rays deviating largely from the reflection path connecting the first focal point F1 and the second focal point F2 are increased, with the result that the condensation efficiency is somewhat decreased. In the case of the former way, however, the vertical component of the light emitting section is larger than in the case where the light emitting section, as in the conventional way, is placed so that the longitudinal direction coincides with the optical axis, and thus the condensation efficiency can be raised if the light transmitting fiber has a relatively large diameter.

Using the results of simulations shown in FIGS. 8 to 11, the specific effects of the first embodiment are described below. For simplicity, it is assumed that the simulations are carried out with respect to only the upper side of the optical axis of the condenser mirror, ranging from the light emitting section to the entrance end of the light transmitting fiber, and the light emitting section is represented by three point sources lying in the longitudinal direction thereof. The conditions of the simulations are as follows:

(1) The condenser mirror is placed so that the elliptical mirror (with a major axis of 80 mm, a minor axis of 46 mm, and an effective opening diameter of 46 mm) is symmetrical to the optical axis.

(2) The entrance end of the light transmitting fiber is located at right angles with the optical axis in the neighborhood of the second focal point F2 of the elliptical mirror.

(3) The dimension of the light emitting section (for example, an arc gap) is 4 mm, and the center of the light emitting section is superimposed on the first focal point F1. The position of each of the point sources representing the light emitting section is indicated by (X, Y), where X Is the coordinate in the direction of the optical axis and Y is the coordinate in the direction normal to the optical axis. In this case, when the coordinates of the first focal point F1 of the elliptical mirror at which one point source is located are taken as (0, 0), two point sources at the ends of the light emitting section on both sides of the first focal point F1 are assumed to take the following positions.

Figure 8:
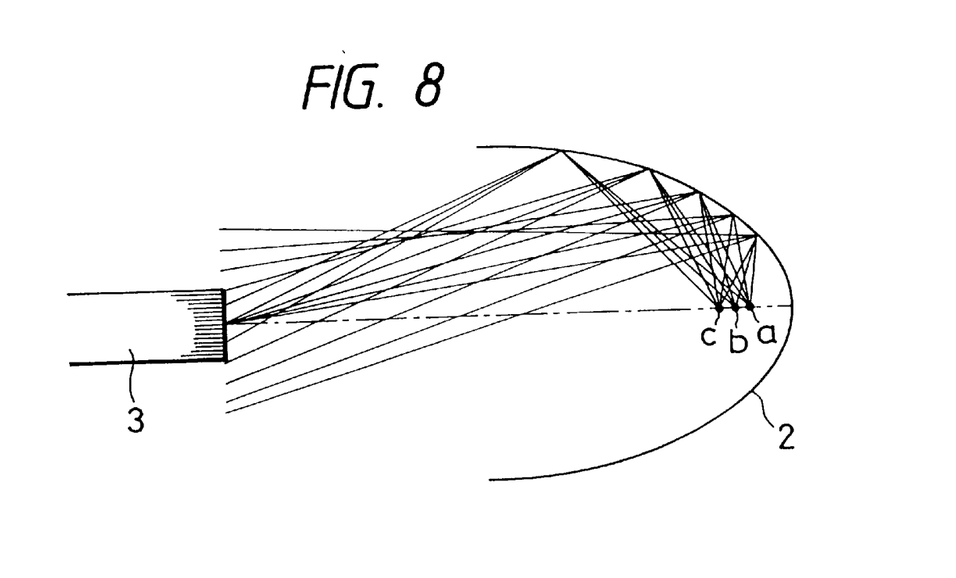
FIG. 8 is a view showing ray tracing when a light emitting section is placed so that its longitudinal direction is the same as the direction of the optical axis in the first embodiment.

FIG. 8: (−2, 0), (2, 0)
FIG. 9: (−1, −√3), (1, √3)
FIG. 10: (−1, √3), (1, −√3)
FIG. 11: (0, 2), (0, −2)

FIG. 8 illustrates an example where the paths of rays are traced, with respect to only the upper side of the optical axis, until rays originating from the points of the above coordinates are reflected by the elliptical mirror 2 and condensed at the end of the light transmitting fiber 3 when the light emitting section, as in the conventional device, is placed so that its longitudinal direction coincides with the direction of the optical axis. In this arrangement, light of large numerical aperture can be obtained by the elliptical mirror 2. Thus, in the case of a thick light transmitting fiber, a good condensation efficiency is brought about, while in the case of a relatively fine light transmitting fiber, rays capable of entering the light transmitting fiber are practically limited to those emanating from the position of the first focal point F1 of the elliptical mirror 2, and hence the condensation efficiency is remarkably impaired.

Figure 9:
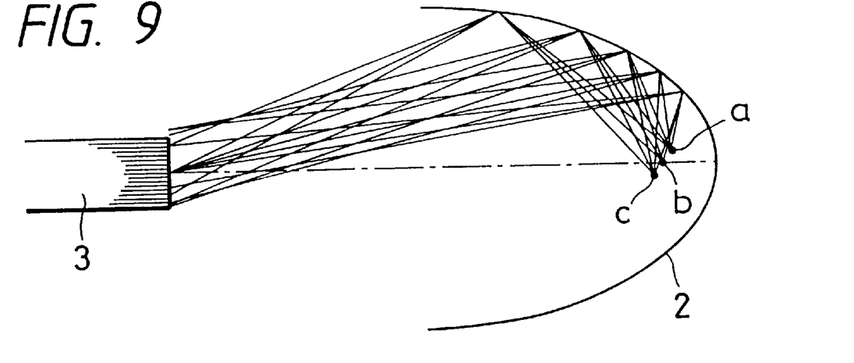
FIG. 9 is a view showing ray tracing when the longitudinal direction of the light emitting section is inclined at 60° counterclockwise with respect to the optical axis in the first embodiment.
Figure 10:
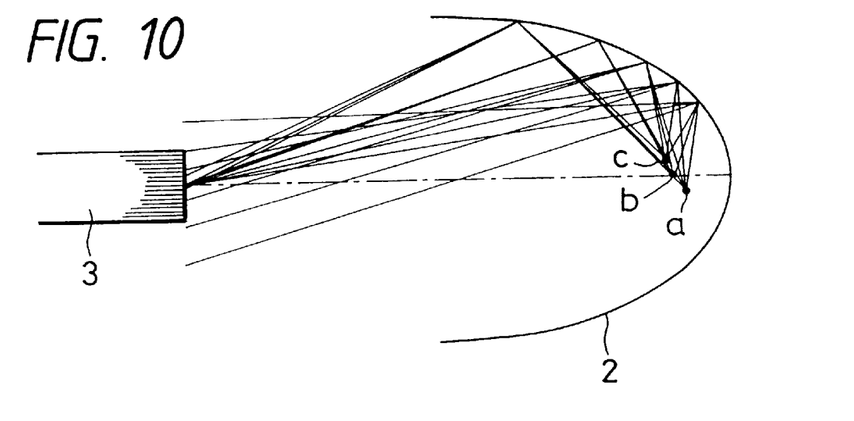
FIG. 10 is a view showing ray tracing when the longitudinal direction of the light emitting section is inclined at 60° clockwise with respect to the optical axis in the first embodiment.

FIGS. 9 and 10 are the diagrams of ray tracing relative to only the upper sides of the optical axes where the light emitting sections are oriented so that their longitudinal directions are inclined at +60° (counterclockwise) and −60° (clockwise), respectively, in regard to the optical axes. Ray tracing diagrams on the lower sides in FIGS. 9 and 10 correspond to the cases where those on the upper sides shown in FIGS. 10 and 9, respectively, are rotated about the axes of abscissas and moved to the lower sides thereof. Specifically, the entire ray tracing diagram containing the light emitting section in FIG. 9 is deriveQ from a combination of the ray tracing diagram on the upper side of FIG. 9 with a ray tracing diagram when the diagram of FIG. 10 is rotated about the axis of abscissas and moved to the lower side. Likewise, the entire ray tracing diagram containing the light emitting section in FIG. 10 is derived from a combination of the ray tracing diagram on the upper side of FIG. 10 with a ray tracing diagram when the diagram of FIG. 9 is rotated about the axis of abscissas and moved to the lower side.

In these examples, the rays from respective regions of the light emitting section are made rather well convergent compared with the conventional device, and it becomes possible that even rays emanating from the positions, other than the first focal point F1, of the light emitting section are incident on the light transmitting fiber 3. Consequently, the condensation efficiency is raised.

Figure 11:
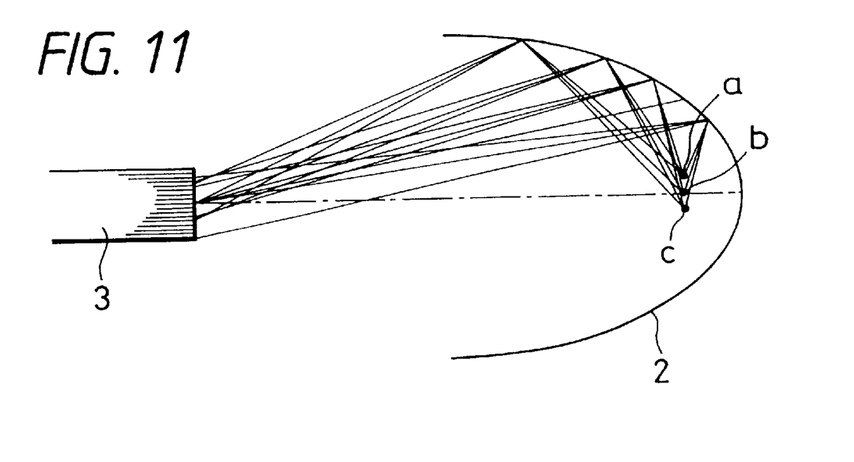
FIG. 11 is a view showing ray tracing when the light emitting section is placed so that its longitudinal direction is perpendicular to the optical axis in the first embodiment.

FIG. 11 shows an example where the light emitting section is placed so that the longitudinal direction is perpendicular to the optical axis and the vertical component of the light emitting section is maximized. In this example, since the rays emanating from respective regions of the light emitting section are made convergent in a considerably narrow area so that they are incident on the light transmitting fiber 3, the best condensation efficiency is secured.

Figure 12:
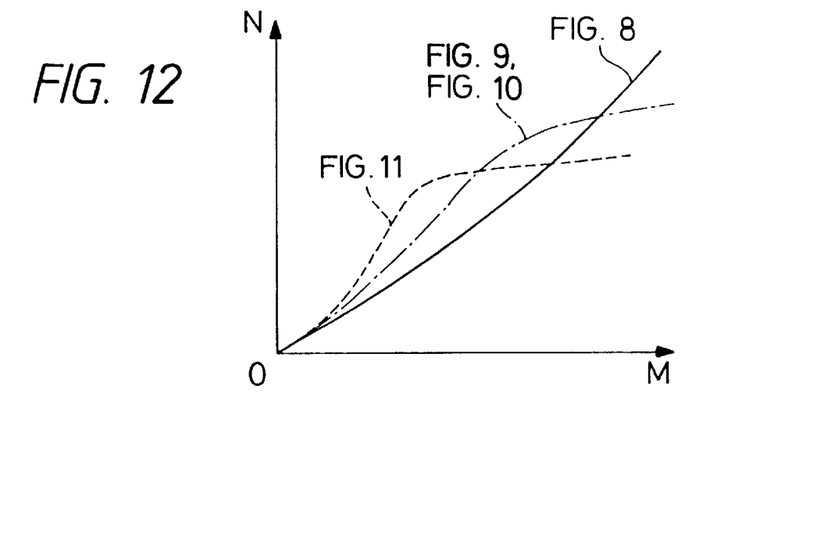
FIG. 12 is a graph showing the relationship between the diameter of the entrance end of the light transmitting fiber and the amount of light incident on the light transmitting fiber, according to the orientation of the light emitting section, for explaining the first embodiment.

FIG. 12 shows the relationship between an entrance end diameter M of the light transmitting fiber and an amount of incident light N on the light transmitting fiber. When the amount of incident light N is taken as the ordinate and the entrance end diameter M as the abscissa, a solid line indicates the case of FIG. 8; a chain line, FIGS. 9 and 10; and a broken line, FIG. 11. According to this graph, in the case of FIG. 8, the condensation diameter is large, and hence, as the entrance end diameter M is increased, the amount of incident light N is also increased. By contrast with this, in the cases of FIGS. 9 and 10 in which the light emitting section is inclined with respect to the optical axis and FIG. 11 in which it is placed perpendicularly, the condensation density is higher and the condensation diameter is smaller. Thus, when the entrance end diameter M is relatively fine, the amount of incident light N is large compared with the case of FIG. 8, but when the entrance end diameter M is increased to some degree, the amount of incident light N ceases to be increased. In this way, it is found that the present invention is useful when the fine light transmitting fiber is employed.

Second embodiment

Figure 13A:
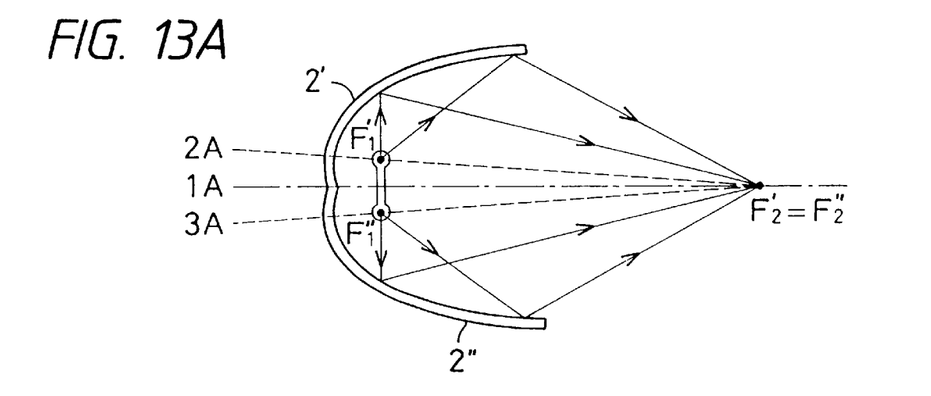
FIGS. 13A and 13B are explanatory views respectively showing a case where the longitudinal direction of the light emitting section is perpendicular to the optical axis and another case where it is inclined, in a second embodiment of the optical illumination device according to the present invention.

When the light emitting section is oriented so that its vertical component is larger than its axial component, the following examples are effective in which the light emitting section is the metal halide lamp which has the peak in the vicinity of the electrodes at the ends constituting the light source. As shown in FIG. 13A, the light emitting section may be placed so that its longitudinal direction is perpendicular to an optical axis 1A and its two peak portions are located at the positions of first focal points F1' and F1" of two elliptical mirrors 2' and 2" or in the vicinities thereof, and the two elliptical mirrors 2' and 2" may be combined so that their second focal points F2' and F2" coincide with each other. In this example, since the two peak portions of the light emitting section exist as point sources for the two elliptical mirrors 2' and 2", the projected images of the peak portions of the light emitting section, as well known, are formed into nearly one point at, or close to, the position of the common second focal point. Furthermore, any portion, other than the peak portions, of the light emitting section is located practically perpendicular to each of optical axes 2A and 3A, and hence, as mentioned in the first embodiment, even rays emitted from portions other than the peak portions of the light emitting section are good in condensation efficiency. Consequently, it is found that the second embodiment is particularly effective when the rays are rendered incident on an extremely fine light transmitting fiber.

Figure 13B:
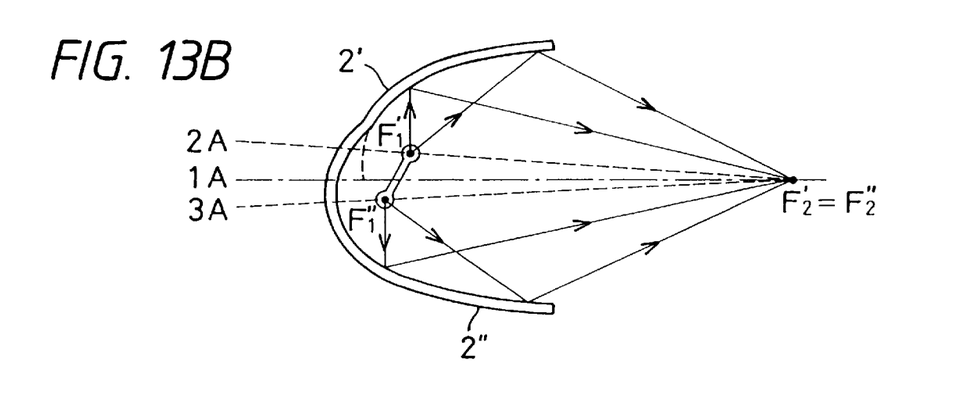

In the second embodiment, even where it is impossible that the light emitting section is placed so that the longitudinal direction is perpendicular to the optical axis 1A, the same effect is secured if, as depicted in FIG. 13B, the light emitting section is oriented so that the longitudinal direction is inclined at 45° or more with respect to the optical axes 2A and 3A and the elliptical mirrors are placed which take the peak portions of the light emitting section as the first focal points and have the common second focal point.

Third embodiment

FIGS. 14 to 24 show the third embodiment of the optical illumination device according to the present invention. In this embodiment, the optical illumination device chiefly includes the elliptical mirror 2, the light emitting section having the dimension in the direction of the optical axis, with its center at the first focal point F1 of the elliptical mirror 2, and the light transmitting fiber (not shown) whose entrance end is located at, or close to, the second focal point F2 of the elliptical mirror 2. The light emitting section is placed so that the longitudinal direction coincides with the optical axis. For simplicity, only portions situated on the optical axis, of the light emitting section, are expressed as the light emitting section in the following description.

Figure 14:
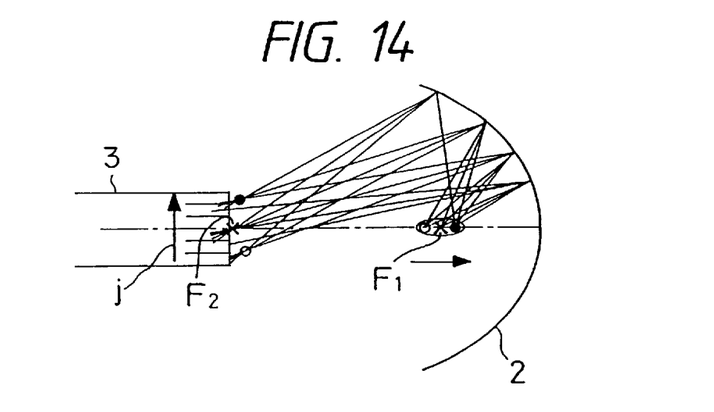
FIG. 14 is a view showing ray tracing when a projected image is normal to the optical axis in a third embodiment of the optical illumination device according to the present invention.

If the elliptical mirror 2 has such a shape that conditions stated below are satisfied, as shown in FIG. 14, the light emitting section will be projected at a predetermined magnification by the elliptical mirror 2 and its projected image j becomes normal or nearly normal to the optical axis. As a result, the light emitting section is unsurpassed for the condensation efficiency in the vicinity of the second focal point F2, and it becomes possible that, in addition to rays emanating from a region, close to the first focal point F1, of the light emitting section to enter the light transmitting fiber, even rays emanating from other regions of the light emitting section are incident on the light transmitting fiber. In this way, the amount of light incident on the light transmitting fiber is increased.

Here, in the elliptical mirror 2, when the major axis of the ellipse divided by 2 is equal to α and the minor axis of the ellipse divided by 2 is equal to β, a paraxial focal length F of the elliptical mirror 2 is found by $F=\beta^2/2(\alpha)$. Calling φ the opening diameter of the elliptical mirror 2 and X the length of the light emitting section in the direction of the optical axis, the conditions are given by $$1.0 < F/X < 5.5 \tag{1}$$

and $$0.19 < F/\phi < 0.30 \tag{2}$$

Figure 15:
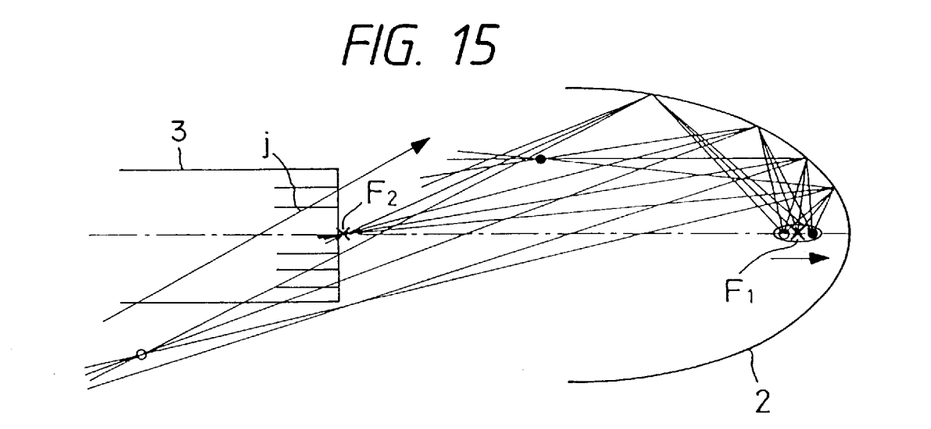
FIG. 15 is a view showing ray tracing when the focal length of the elliptical mirror is reduced and the projected image is inclined in the third embodiment.
Figure 16:
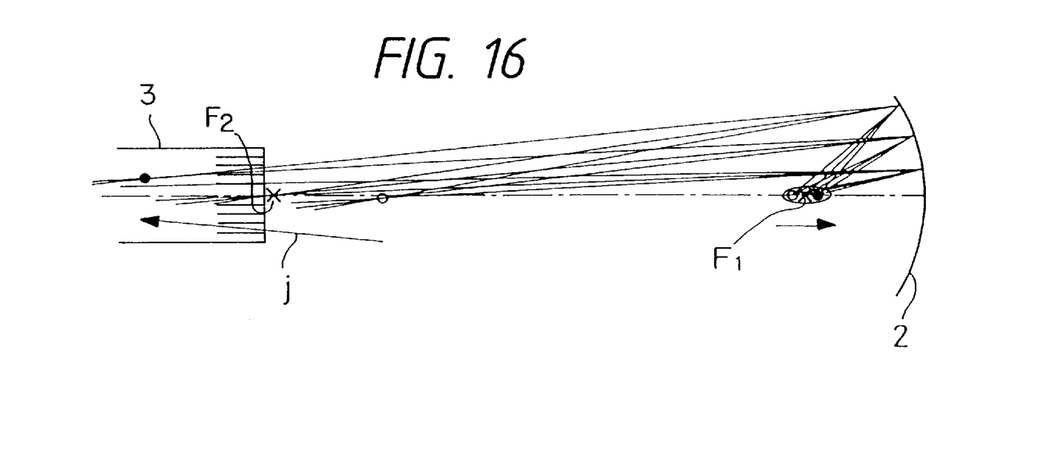
FIG. 16 is a view showing ray tracing when the focal length of the elliptical mirror is increased and the projected image is inclined in the third embodiment.

Subsequently, a description is given of technical meanings of Eqs. (1) and (2). Eq. (1) is provided for the purpose of securing the limit of the focal length of the elliptical mirror 2 so that the projected image j of the light emitting section formed by the elliptical mirror 2 becomes normal or nearly normal to the optical axis in accordance with the length of the light emitting section in the direction of the optical axis. In general, different curvatures of the elliptical mirror are obtained from different parts thereof, and under this influence, rays leaving points shifted from the first focal point F1 of the elliptical mirror 2 are condensed in the vertical direction of the optical axis and before and behind the second focal point F1 at great distances therefrom. Where the length X of the light emitting section In the direction of the optical axis is made constant, if the focal length F is so small that the lower limit of 1.0 of Eq. (1) is passed, the difference in curvature between the different parts of the elliptical mirror will be increased, and the rays leaving the points shifted from the first focal point F1 will be condensed at positions shifted from the second focal point F2. Hence, as illustrated in FIG. 15, the projected image j of the light emitting section is right side up but is inclined rightward with respect to the optical axis. Consequently, rays capable of entering the light transmitting fiber are limited to those leaving only one portion of the light emitting section, and the amount of light incident on the light transmitting fiber will be reduced. Conversely, even if the focal length F is so large that the upper limit of 5.5 is overstepped, the difference in curvature between the different parts of the elliptical mirror will be increased, and as shown in FIG. 16, the projected image j of the light emitting section is right side up but is inclined leftward with respect to the optical axis. Thus, the subject of the present invention cannot be realized.

Eq. (2), on the other hand, is provided for the purpose of securing an effective opening diameter which is most suitable for the elliptical mirror having the focal length determined by Eq. (1). For the focal length F of the elliptical mirror determined by Eq. (1), if the effective opening diameter φ of the elliptical mirror is so large that the lower limit of 0.19 of Eq. (2) is exceeded, the region of the elliptical mirror reflecting rays which are not substantially incident on the light transmitting fiber will merely be added, without increasing the amount of light incident on the light transmitting fiber, and the device itself becomes oversized. Conversely, if the upper limit of Eq. (2) is not less than 0.3 (preferably 0.25) and the effective opening diameter φ of the elliptical mirror becomes very small, the region of the elliptical mirror reflecting rays so as to be substantially incident on the light transmitting fiber will be lacking, and the amount of light incident on the light transmitting fiber will be decreased.

For the light emitting section having a certain dimension in the direction of the optical axis, as mentioned above, the focal length of the elliptical mirror is determined so as to satisfy Eq. (1), and by Eq. (2), the effective opening diameter is determined such that brightness and size are most suitable for the elliptical mirror having the determined focal length. As such, it becomes possible that, in addition to rays leaving a region, close to the first focal point $F_1$, of the light emitting section to enter the light transmitting fiber, even rays emanating from other regions of the light emitting section are efficiently incident on the light transmitting fiber. The amount of light incident on the light transmitting fiber is thus increased.

The numerical examples of the factors X, α, β, φ, and F in the device of the present invention are given in Table 1. For numerical examples 1 to 4, the states of condensation of rays relative to ray tracing of the upper half of the elliptical mirror are shown in FIGS. 17 to 20, respectively. The light emitting section is represented by three point sources lying on the optical axis. The position of each of the point sources is indicated by (X, Y) where X is the coordinate in the direction of the optical axis and Y is the coordinate in the direction normal to the optical axis. In this case, the coordinates of the first focal point $F_1$ of the elliptical mirror at which one point source is located are taken as (0, 0). The positions of two point sources at the ends of the light emitting section on both sides of the first focal point $F_1$ are assumed to be (−2, 0) and (2, 0).

TABLE 1

|  | X (mm) | α (mm) | β (mm) | φ (mm) | F (mm) | F/X | F/φ |
|---|---|---|---|---|---|---|---|
| Example 1 | 4.0 | 29.445 | 25.5 | 48 | 11.042 | 2.76 | 0.23 |
| Example 2 | 4.0 | 35.13 | 27.21 | 52 | 10.538 | 2.63 | 0.203 |
| Example 3 | 4.0 | 38.5576 | 30.609 | 60 | 12.15 | 3.04 | 0.203 |
| Example 4 | 4.0 | 58.4986 | 42.9995 | 70 | 15.803 | 3.95 | 0.226 |

Figure 21:
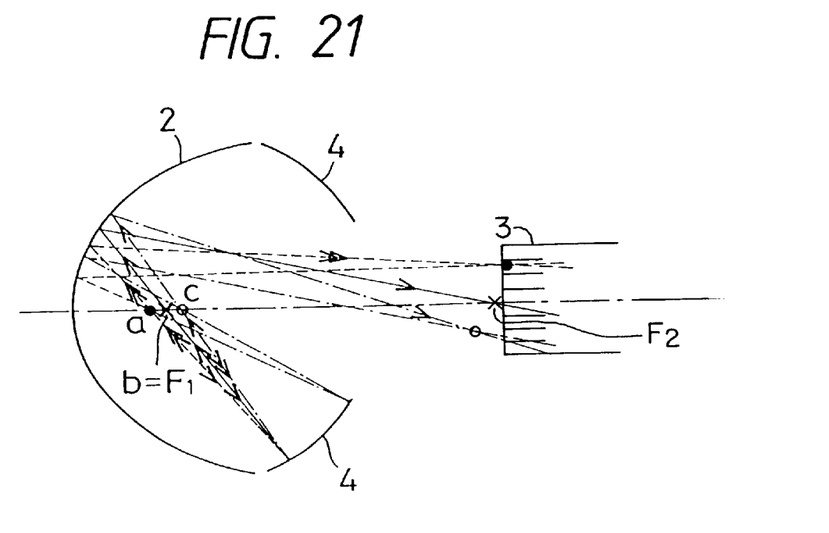
FIG. 21 is an explanatory view showing the case where the reflecting mirror is placed opposite to the elliptical mirror in the third embodiment.

FIG. 21 shows the state of condensation of rays diffused between the opening edge of the elliptical mirror 2 and the entrance end of the light transmitting fiber (not shown) when the reflecting mirror 4 (with a radius of curvature of 29 mm, an effective major opening diameter of 52 mm, and an effective minor opening diameter of 27 mm) having the center of curvature in the vicinity of the first focal point $F_1$ is placed opposite to the elliptical mirror of numerical example 2. In this case, the light emitting section is represented by the three points a, b, and c so that the point b is placed at the first focal point $F_1$, the point a is spaced away from the point b toward the elliptical mirror, and the point c is spaced away from the point b toward the light transmitting fiber. Of the rays diffused between the opening edge of the elliptical mirror 2 and the entrance end of the light transmitting fiber, rays emanating from the point b located at the first focal point $F_1$ of the elliptical mirror 2 are collected again at the point b by the reflecting mirror 4. Further, rays leaving the points a and c are collected at the points c and a, respectively. In this way, the light emitting section is projected on the optical axis at an equimagnification by the reflecting mirror 4, and this projected image is formed nearly normal to the optical axis by the elliptical mirror 2. Then, most of the rays diffused between the opening edge of the elliptical mirror 2 and the entrance end of the light transmitting fiber can be introduced into the light transmitting fiber, and hence the additional placement of the reflecting mirror 4 brings about a considerable effect. Consequently, by combining the elliptical mirror 2 of numerical example 1 and the reflecting mirror 4, most of the rays emitting from the light emitting section can be introduced into the light transmitting fiber.

Figure 22:
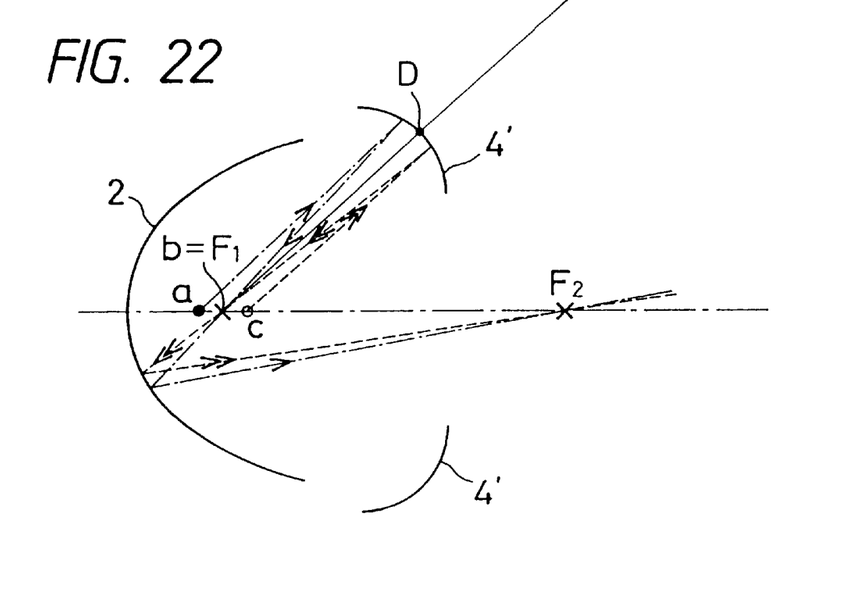
FIG. 22 is an explanatory view showing the case where a parabolic mirror is placed opposite to the elliptical mirror in the third embodiment.
Figure 23:
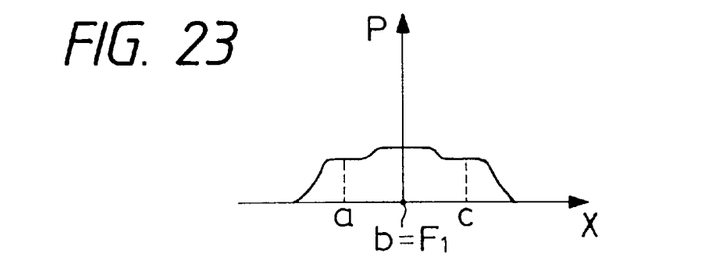
FIG. 23 is a graph showing the intensity distribution of the light emitting section formed when the parabolic mirror is placed opposite to the elliptical mirror.

In FIG. 21, instead of the reflecting mirror 4 having the center of curvature at the first focal point $F_1$ of the elliptical mirror 2, as shown in FIG. 22, a parabolic mirror 4' having a focal point at the first focal point $F_1$ may be used. According to this arrangement, of the rays emanating from the points a and c of the light emitting section, rays parallel to a line connecting the point b and a vertex D of the parabolic mirror 4' are collected at the point b by the parabolic mirror 4', and other rays emanating from the points a and c are also collected around the point b, along with the parallel rays. Thus, where the light emitting section is the metal halide lamp having the peak distribution in the vicinity of the electrodes of ends constituting the light source, reflected light by the parabolic mirror 4' is superimposed on the light emitting section, and thereby the intensity of light from the light emitting section, as illustrated in FIG. 23, has a relatively even distribution with the peak around the point b. Also, in this graph, an intensity of light P is plotted along the axis of ordinates and a distance X in the direction of the optical axis is plotted along the axis of abscissas.

The projected image of the light emitting section thus formed by the elliptical mirror becomes nearly perpendicular to the optical axis, and the condensation efficiency is good. In addition to this, most of the rays emanating from the position of the first focal point $F_1$ are condensed in the neighborhood of the second focal point $F_2$, and thus where the parabolic mirror 4' is used, the rays can be rendered efficiently incident on a considerably fine light transmitting fiber.

Figure 17:
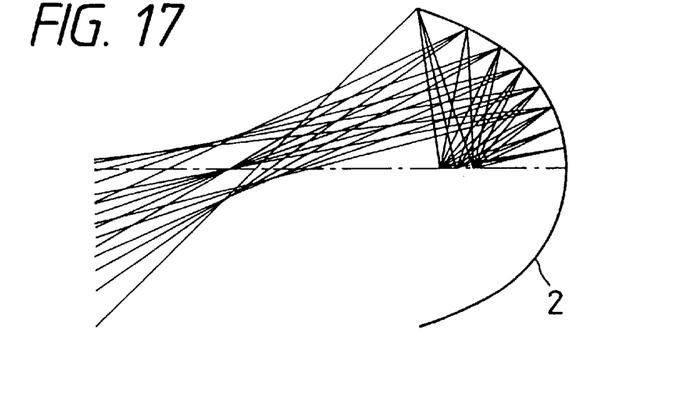
FIGS. 17, 18, 19, and 20 are views showing ray tracing of respective numerical examples in the third embodiment.
Figure 18:
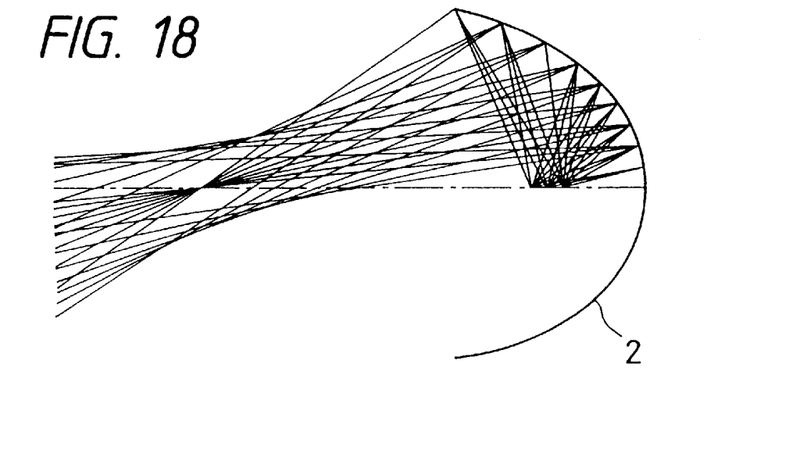
Figure 19:
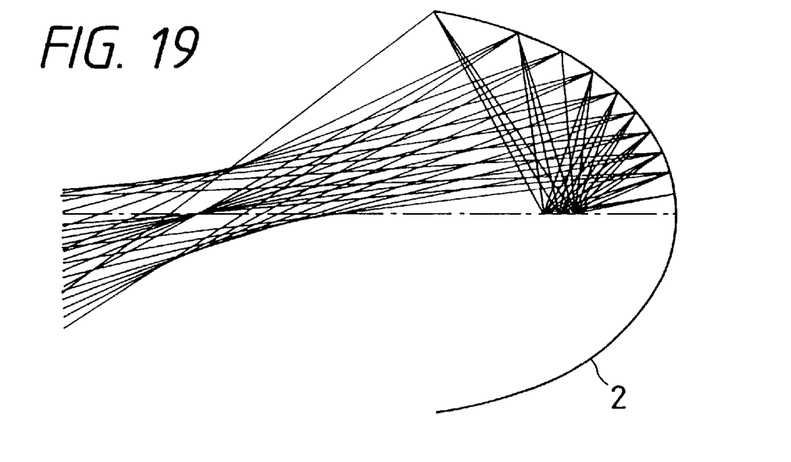
Figure 20:
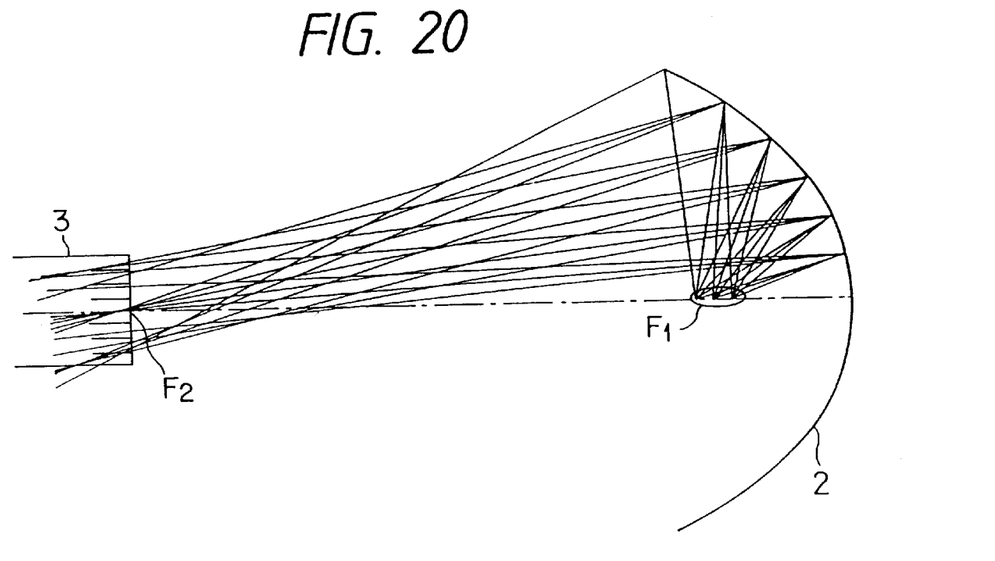
Figure 24:
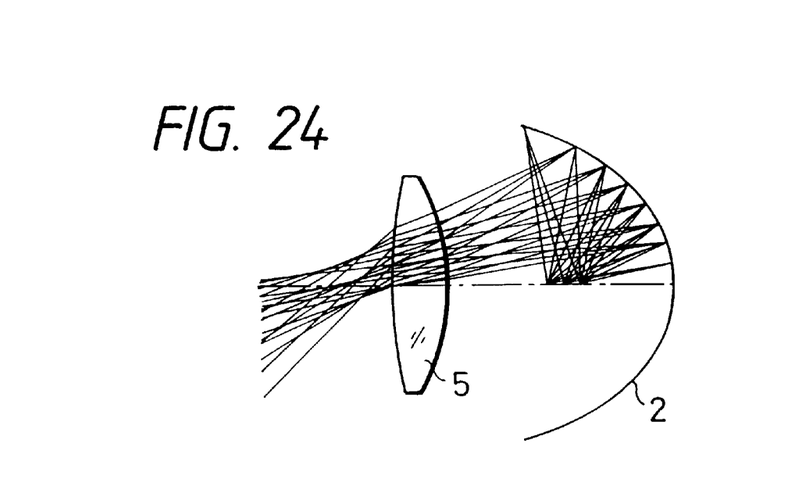
FIG. 24 is a view showing ray tracing when the condenser lens is interposed between the elliptical mirror and the light transmitting fiber in the third embodiment.

FIG. 24 shows the state of condensation of rays when the condenser lens 5 is interposed between the elliptical mirror 2 of numerical example 1 and the entrance end of the light transmitting fiber (not shown). The result of ray tracing of numerical example 1 is shown in FIG. 17, and where the elliptical mirror of this figure is used, the projected image of the light emitting section formed by the elliptical mirror becomes nearly perpendicular to the optical axis. Thus, when the condenser lens 5 is placed as in FIG. 24, the rays emanating from respective points of the light emitting section can be uniformly condensed in a narrow area. In this way, when the projected image of the light emitting section by the elliptical mirror is nearly perpendicular to the optical axis, the additional placement of the condenser lens 5 brings about a considerable effect. It becomes thus possible that most of the rays leaving the regions of the light emitting section are incident on the light transmitting fiber.

Fourth embodiment

When the elliptical mirror, such as that described in the third embodiment, is used which has such a shape that the projected image of the light emitting section formed by the elliptical mirror becomes perpendicular or nearly perpendicular to the optical axis, the following example is useful in which the light emitting section is the metal halide lamp such as to have the peak distribution in the vicinity of the electrodes of ends constituting the light source.

Figure 25A:
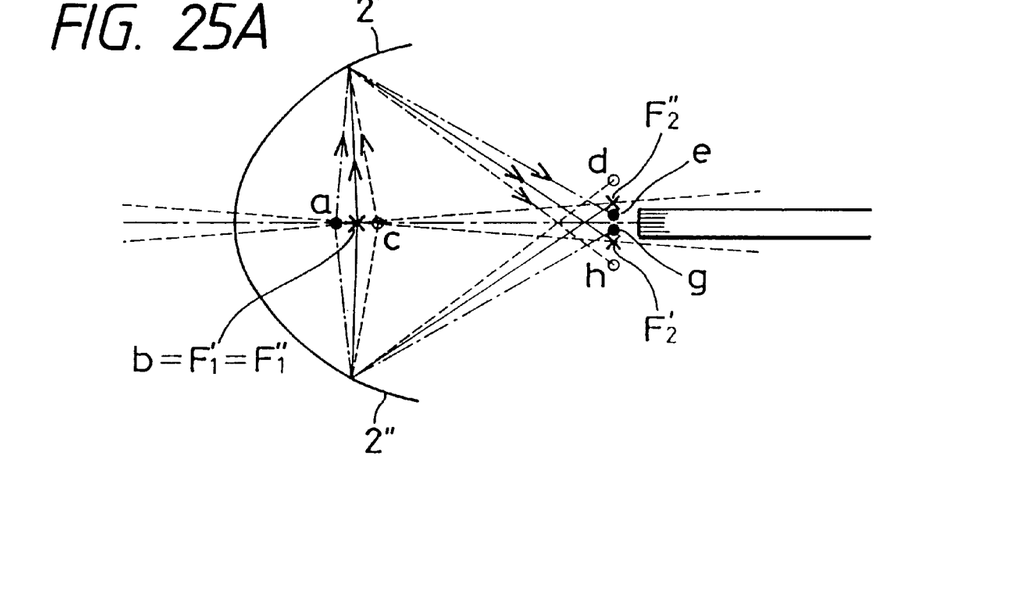
FIG. 25A is an explanatory view showing the case where the light emitting section is placed so that its longitudinal direction coincides with the optical axis, and two elliptical mirrors are arranged, in a fourth embodiment of the optical illumination device according to the present invention.
Figure 25B:
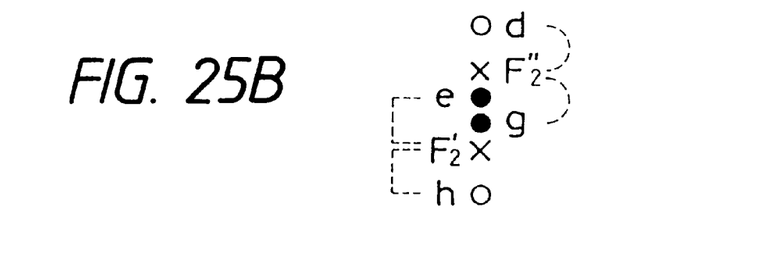
FIG. 25B is an enlarged view showing a state of condensation in FIG. 25A.

In FIG. 25A, the light emitting section is placed so that its longitudinal direction coincides with the optical axis, and the two elliptical mirrors 2' and 2" are arranged so that their first focal points $F_1'$ and $F_1''$ coincide with each other at the point b centered in the light emitting section. FIG. 25B is an enlarged diagram showing the state of condensation.

Figure 26:
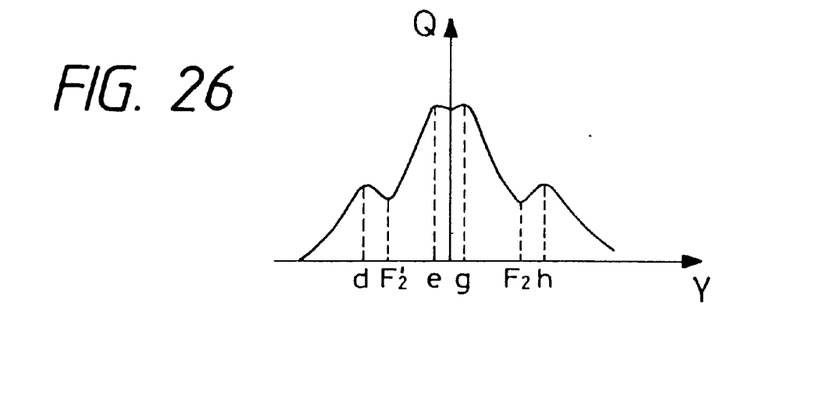
FIG. 26 is a graph showing an intensity distribution with a condensing surface in the fourth embodiment.

The second focal point of the elliptical mirror 2' lies at the point $F_2'$ and that of the elliptical mirror 2" lies at the point F2". The optical axis of the elliptical mirror 2' crosses that of the elliptical mirror 2". The light emitting section is represented by the three points a, b, and c so that the point b is placed at the first focal point F1' (=F1") where the focal positions of the two elliptical mirrors 2' and 2" coincide with each other, the point a is spaced away from the point b toward the elliptical mirrors, and the point c is spaced from the point b toward the light transmitting fiber. In doing so, the points a, b, and c are respectively projected at points e, F2', and h by the elliptical mirror 2', and at points g, F2", and d by the elliptical mirror 2". The intensity distribution on the condensing surface in this case is shown in FIG. 26. Also, in this graph, an intensity of light Q is plotted along the axis of ordinates and a distance Y in the direction of a cross section normal to the optical axis is plotted along the axis of abscissas.

Although the intensity distribution of the light emitting section itself has peaks at the ends, that of the projected image of the light emitting section superposed by the two elliptical mirrors has the peaks around the center. This is because two projected images of the point a of the light emitting section which brings about the peaks of intensity are formed close together around the optical axis. For this reason, a narrow area around the imaging points e and g has a high condensation density. Thus, in the fourth embodiment, the light can be rendered efficiently incident on an extremely fine light transmitting fiber.

What is claimed is:

1. An optical illumination device for introducing illumination light into a light transmitting fiber, said optical illumination device comprising:

a light source aligned lengthwise along the optical axis of said light transmitting fiber; and an elliptical mirror placed behind said light source, the center of said light source being located substantially at a first focal point of said elliptical mirror, an entrance end of said light transmitting fiber being located substantially at a second focal point of said elliptical mirror, and said elliptical mirror having such a shape that a projected image of said light source is aligned lengthwise in a direction substantially perpendicular to the optical axis.

2. An optical illumination device according to claim 1, wherein said elliptical mirror satisfies the conditions following $$1.0 < F/X < 5.5$$

and $$0.19 < F/\phi < 0.30,$$

where X is the dimension of said light source in the direction of the optical axis, $\phi$ where is an opening diameter of said elliptical mirror, and F where is a focal length of said elliptical mirror, said focal length being defined by an equation $F=\beta^2/2(\alpha)$, where $\alpha$ is one-half the length of the major axis of said elliptical mirror and $\beta$ is one-half the length of the minor axis of said elliptical mirror.

3. An optical illumination device according to claim 1, wherein said light source is disposed substantially length along the center axis of said light transmitting fiber.

* * * * *

UNITED STATES PATENT AND TRADEMARK OFFICE
CERTIFICATE OF CORRECTION

PATENT NO. : 5,918,974
DATED : Jul. 6, 1999
INVENTOR(S) : Suzuki et al.

It is certified that error appears in the above-identified patent and that said Letters Patent is hereby corrected as shown below:

Column 14, lines 12-13, (claim 2, lines 2-3), change "conditions following" to --following conditions--;

Column 14, line 22 (claim 2, line 8), change "φ where" to --where φ--;

Column 14, line 23, (claim 2, line 9), change "F where" to --where F--.

Column 14, line 30, (claim 3, line 2, change "substantially length" to --lengthwise substantially--.

Signed and Sealed this

Eleventh Day of April, 2000

Attest:

Q. TODD DICKINSON

Attesting Officer

Director of Patents and Trademarks